Nov. 1, 1955 S. D. RUSSELL 2,722,132
SPANNER FOR SUPPORTING OVERHUNG SHAFTS
Filed Oct. 18, 1950 2 Sheets-Sheet 1
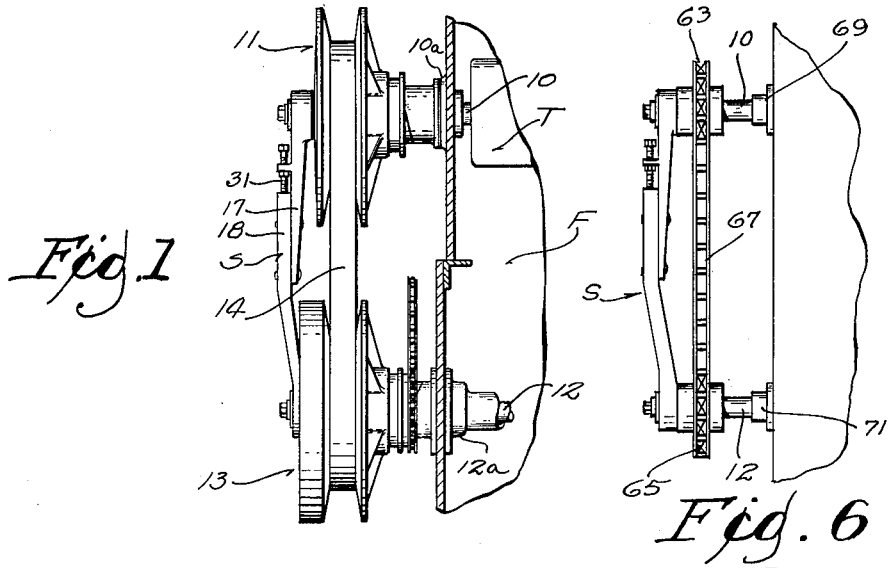
Fig. 1
Fig. 6
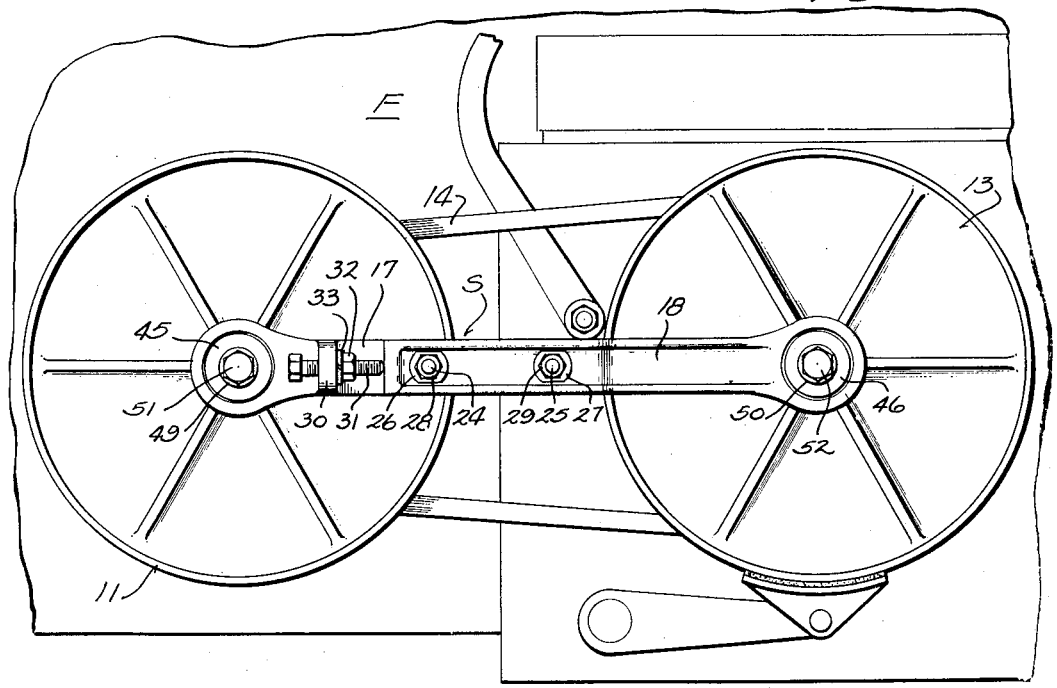
Fig. 2
Inventor
STANLEY D. RUSSELL
By
AGENT Nov. 1, 1955  S. D. RUSSELL  2,722,132
SPANNER FOR SUPPORTING OVERHUNG SHAFTS
Filed Oct. 18, 1950  2 Sheets-Sheet 2
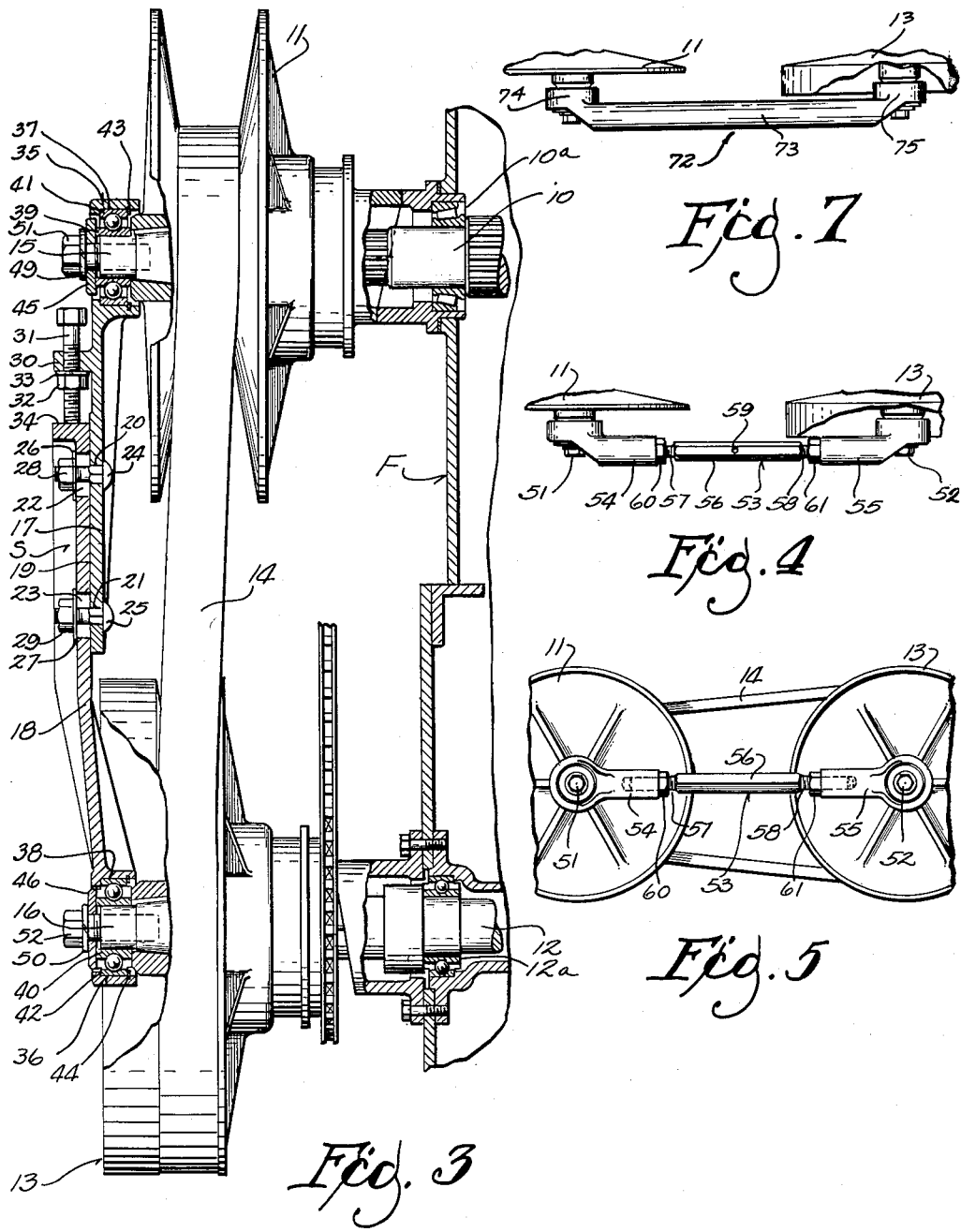
Inventor
STANLEY D. RUSSELL
By

United States Patent Office 2,722,132
Patented Nov. 1, 1955

2,722,132

SPANNER FOR SUPPORTING OVERHUNG SHAFTS

Stanley D. Russell, Racine, Wis., assignor to J. I. Case Company, Racine, Wis., a company of Wisconsin Application October 18, 1950, Serial No. 190,842

2 Claims. (Cl. 74—242.13)

This invention relates to a power transmission device and especially to implements employing belt or chain drives between a pair of shafts.

An object of this invention is to provide a means of mutually supporting a pair of overhung shafts against forces normally induced by a belt or chain and which forces tend to deflect the shafts causing damage to the bearings.

Another object is to reduce the tendency of overhung shafts to crystallize, by providing a mutual support at their ends.

Another object is to provide means of support for overhung portions of shafts, thereby allowing a reduction in diameters.

Another object is to facilitate the removal of belts or chains from power transmission devices.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 is a plan view of a device showing the invention incorporated therein;

Fig. 2 is an elevational view;

Fig. 3 is an enlarged fragmentary sectional plan view with parts broken away;

Fig. 4 is a plan view showing a modification of the invention;

Fig. 5 is an elevational view of the modification of Fig. 4;

Fig. 6 shows the invention when used with a chain drive and

Fig. 7 shows the spanner member made in one piece.

The invention is embodied in this instance, in an implement having a variable speed, belt driven transmission located on a pair of outwardly-extending overhung shafts, in this instance one shaft being a drive shaft and the other a driven shaft. The implement in this instance is a baler of a design which does not permit locating the variable speed transmission at a place so as to provide convenient frame mounted bearings on both sides of the pulleys, and also allow convenient access to the belt or chain when they require replacing. The provision of frame-mounted brackets for the support of the outer ends of the shafts would normally interfere with the convenient accessibility of pulleys and belts when repairs are necessary. This invention provides mutual support at the very point and in the direction where such support is effective; along a line passing between the axes of the two shafts, and parallel to the forces induced by the tension of the belt or chain on the pulleys or sprockets.

Referring to Fig. 1, F in this instance is a frame of a baler. A transmission T is mounted in frame F and a drive shaft 10 extends outwardly from frame F and carries a variable speed drive pulley 11. A cross shaft 12 is mounted parallel to shaft 10 at a suitable distance therefrom and which shaft carries a variable speed pulley 13. Shafts 10 and 12 are journalled in anti-friction bearings 10ª and 12ª which bearings have outer and inner races. The outer races are a snug fit in the frame F, and support shafts 10 and 12. A belt 14 serves to transmit power from pulley 11 to pulley 13. A spanner S spans the space between shafts 10 and 12. It will be clear from inspection of Figs. 1 and 2, that owing to the necessary mechanism within frame F, there is lack of space to mount the pulleys 11 and 13 therein. This fact explains the reason for the necessity of mounting these pulleys on the exterior of the frame F, and which arrangement also makes clear the necessity for the present invention. Other details shown on Fig. 1 will not be described as they do not bear directly on the present invention.

Referring to Figs. 2 and 3, no further description will be made of pulleys 11 and 13 except to say that they are part of a variable belt drive, and their attendant mechanism is of no specific interest in considering this invention.

The preferred form of this invention is shown in Figs. 1, 2 and 3 and comprises essentially, the spanner S. Shafts 10 and 12 have extensions 15 and 16 which extend a suitable distance beyond pulleys 11 and 13 in order to accommodate the bearings for the spanner S.

Spanner S consists of two members 17 and 18 secured together for adjustment in the direction of the axes of shafts 10 and 12. The purpose of the above mentioned adjustment will appear more clearly as the description proceeds. Members 17 and 18 as shown in Figs. 1 to 3 are of cast material and in this instance overlap each other, having common contact surfaces 19. Member 17 has a pair of square holes 20 and 21, and member 18 has elongated apertures 22 and 23 in alignment with holes 20 and 21. Bolts 24 and 25 having square shanks under the heads thereof pass through holes 20 and 21 and through apertures 22 and 23. Washers 26 and 27 and nuts 28 and 29 when assembled on bolts 24 and 25 complete the means of securing members 17 and 18 together after the adjustment is made.

Means is provided to enable accurate adjustment of the length of the spanner S. This means comprises a lug 30 integral with member 17. An adjusting screw 31 is threaded into lug 30 and has a hexagon or square head to accommodate a wrench in order to make adjustments. A lock nut 32 and a washer 33 provide means of securing screw 31 at the adjustment desired. Screw 31 abuts against an abutment 34 which is integral with member 18 and having a surface normal to the axis of screw 31.

Bearings are provided at the ends of spanner S which bearings may be plain bushings or anti-friction bearings. In this instance anti-friction bearings 35 and 36 are shown. Members 17 and 18 are provided with recesses 37 and 38 as shown in Fig. 3, and which recesses are co-axial with the shaft 10 and 12. Bearings 35 and 36 are of the type having a series of balls running between inner races 39 and 40, and outer races 41 and 42. Inner races 39 and 40 are a snug fit on shaft extensions 15 and 16, and outer races 41 and 42 are a snug fit in recesses 37 and 38. Snap rings 43 and 44 serve to retain bearings 35 and 36 in recesses 37 and 38 against axial displacement, rings 43 and 44 being so positioned as to contact outer races 41 and 42. Spanner S is prevented from being axially displaced from extensions 15 and 16 by washers 45 and 46 which contact the exposed face of inner races 39 and 40. Lock washers 49 and 50, and cap screws 51 and 52 serve to retain the spanner S on the shafts 10 and 12. Threaded holes are provided in the ends of shafts 10 and 12 to accommodate cap screws 51 and 52.

Referring to the modification shown in Figs. 4 and 5; 53 is a spanner identical in function to spanner S but of different design and which will now be described. Spanner 53 comprises end portions 54 and 55 which are fitted with bearings similarly to those fitted to spanner S. A turn buckle member 56 of hexagon or other suitable shape, connects end portions 54 and 55 and has threaded ends 57 and 58, one of which is left-handed and the other right-handed. Corresponding threaded holes are provided in portions 54 and 55. The turning of member 56 results in adjusting the distance between the axes of the bearings 35 and 36, and a hole 59 is provided so a bar can be used in making the adjustment. Nuts 60 and 61 are threaded on ends 57 and 58 and, after an adjustment is made, are threaded against portions 54 and 55, thus locking the turnbuckle member against turning thereby maintaining the adjustment.

The purpose of providing the adjustment of the above described spanner will now be set forth. Owing to the necessary manufacturing tolerances it is obvious that the distance between the axes of the shafts in a group of machines will differ. This difference may be small but the use of anti-friction bearings in this instance requires the center distances between the shaft axles and the bearing recesses to be substantially identical in order to avoid undue wear in the bearings. The above construction permits assembling the spanner on the two shafts and then securing the two halves of the spanner together.

Fig. 6 shows the invention applied to a chain and sprocket drive. Shafts 10 and 12 carry sprockets 63 and 65. A chain 67 transmits power between sprockets 63 and 65 and which power transmission induces forces normal to the axes of shafts 10 and 12 which subject the bearings 69 and 71 to excessive wear. The spanner S is similar to that shown in Fig. 1 and need not be further described.

There may be instances where a non-adjustable spanner may be suitable such as that shown in Fig. 7. In this instance spanner 72 has a central portion 73 and bearing bosses 74 and 75, the latter accommodating bearings as before described. This type of spanner is permissible where the center distance between shafts 10 and 12 is identical with that between the axes of the spanner bearings.

In conclusion it will be seen that what has been provided is a means of supporting the overhung portions of shafts 10 and 12 against the forces induced by the pull of a belt or chain mutually engaging a pair of pulleys or sprockets on the shafts.

The above being a complete description of an illustrative embodiment of the invention, what is claimed as new and desired to be secured by Letters Patent of the United States is:

1. In an implement having a frame, a pair of mutually-parallel shafts having fixed center distances and supported in bearings in said frame, said shafts having extended ends and provided with pulleys spaced from said frame, and a belt mutually associated with said pulleys, in combination, a spanner disposed so as to mutually support said shafts against forces induced by said belt, comprising, a pair of overlapping members having mutually-contacting plane surfaces lying substantially in a plane normal to the axes of said shafts and secured together for adjustment normal to said axes, one of said members being provided with a lug, an adjusting screw threadedly engaged in said lug, the other member having an end terminating in an abutment surface perpendicular to the axis of said screw, said screw contacting said abutment surface to preserve the adjustment of said overlapping members in one direction normal to the axes of said shafts, and means to lock the said screw against rotation after said adjustment has been made.

2. In an implement having a frame, a pair of mutually-parallel shafts spaced apart and supported in bearings in said frame, said shafts having extending ends and provided with power transmission means thereon and connecting said shafts, in combination, a spanner disposed so as to mutually support said shafts against forces induced by said power transmission means, comprising, a pair of overlapping members having mutually-contacting plane surfaces lying substantially in a plane normal to the axes of said shafts and secured together for adjustment normal to said axes, one of said members being provided with a lug, an adjusting screw threadedly engaged in said lug, the other member having an end terminating in an abutment surface perpendicular to the axis of said screw, said screw contacting said abutment surface so as to preserve the adjustment of said overlapping members in a direction normal to the axes of said shafts, and means to lock the said screw against rotation after said adjustment has been made.

References Cited in the file of this patent
UNITED STATES PATENTS

| Number | Name | Date |
|---|---|---|
| 552,547 | Reazor | Jan. 7, 1896 |
| 602,906 | King | Apr. 26, 1898 |
| 642,242 | Miller | Jan. 30, 1900 |
| 789,344 | Wattie | May 9, 1905 |
| 1,906,415 | Rauch | May 2, 1933 |